US011500938B2

(12) United States Patent
Cosentino et al.

(10) Patent No.: US 11,500,938 B2
(45) Date of Patent: Nov. 15, 2022

(54) SYSTEMS AND METHODS FOR COLLECTING DIGITAL FORENSIC EVIDENCE

(71) Applicant: Magnet Forensics Investco Inc., Waterloo (CA)

(72) Inventors: Nicholas Bruce Alexander Cosentino, Waterloo (CA); Christine McGarry, Waterloo (CA); Matthew Moody, Waterloo (CA); Christopher Sippel, Waterloo (CA)

(73) Assignee: Magnet Forensics Investco Inc., Waterloo (CA)

( * ) Notice: Subject to any disclaimer, the term of this patent is extended or adjusted under 35 U.S.C. 154(b) by 29 days.

(21) Appl. No.: 15/487,168

(22) Filed: Apr. 13, 2017

(65) Prior Publication Data

US 2017/0300594 A1     Oct. 19, 2017

Related U.S. Application Data

(60) Provisional application No. 62/321,869, filed on Apr. 13, 2016.

(51) Int. Cl.
*G06F 16/903* (2019.01)
*G06Q 50/26* (2012.01)
*G06Q 10/00* (2012.01)
*G06F 16/9032* (2019.01)

(52) U.S. Cl.
CPC .... *G06F 16/90344* (2019.01); *G06F 16/9032* (2019.01); *G06Q 10/00* (2013.01); *G06Q 50/26* (2013.01)

(58) Field of Classification Search
CPC ................................................ G06F 16/90344
See application file for complete search history.

(56) References Cited

U.S. PATENT DOCUMENTS

| | | | |
|---|---|---|---|
| 6,151,608 A | * | 11/2000 | Abrams ................ G06F 16/214 707/679 |
| 6,279,010 B1 | | 8/2001 | Anderson |
| 8,566,903 B2 | | 10/2013 | Kisin et al. |
| 8,838,094 B2 | | 9/2014 | Thing |
| 8,849,991 B2 | | 9/2014 | Levy et al. |
| 9,081,838 B2 | | 7/2015 | Hoog |
| 2003/0208689 A1 | | 11/2003 | De La Garza |
| 2006/0064429 A1 | | 3/2006 | Yao |
| 2007/0085711 A1 | * | 4/2007 | Bousquet ............... G06Q 10/10 341/50 |
| 2008/0065593 A1 | * | 3/2008 | Minder ................. G06F 16/235 |

(Continued)

OTHER PUBLICATIONS

Scalpel: A Frugal, High PerformanceFile Carver Golden G. Richard III, Vassil Roussev presented by Muhammad Naseer (Year: 2013).*

(Continued)

*Primary Examiner* — Hau H Hoang
(74) *Attorney, Agent, or Firm* — Own Innovation; James W. Hinton (57) ABSTRACT

Methods and apparatus for acquiring and analyzing digital forensic data using a computing device. Forensic data collections are retrieved by a computing device, and artifacts can be identified according to a variety of display types and presentation formats specified in an extensible format, to facilitate review and reporting by a user.

16 Claims, 4 Drawing Sheets

(56) References Cited

U.S. PATENT DOCUMENTS

| | | | | |
|---|---|---|---|---|
| 2010/0161615 | A1* | 6/2010 | Lee | G06F 21/80 |
| | | | | 707/741 |
| 2011/0231794 | A1* | 9/2011 | Gubanov | G06F 16/30 |
| | | | | 715/810 |
| 2014/0244582 | A1 | 8/2014 | Grier | |
| 2014/0294316 | A1 | 10/2014 | Allamsetty | |
| 2014/0325661 | A1 | 10/2014 | Hoog | |
| 2015/0121522 | A1 | 4/2015 | Guido | |
| 2018/0069881 | A1* | 3/2018 | Graves | H04L 43/028 |

OTHER PUBLICATIONS

Forensic analysis of the Firefox 3 internet history and recovery of deleted SQLite records, written by Murilo Tito Pereira (hereafter Pereira), Digital Investigation 5 (2009) 93-103, ScienceDirect 2009 (Year: 2009).*

Digital Evidence for Database Tamper Detection written by Shweta Tripathi, Mar. 4, 2012 (Year: 2012).*

On metadata context in Database Forensics, Martin S. Olivier, Oct. 13, 2008 (Year: 2008).*

The International Search Report (ISR) and Written Opinion of the International Searching Authority for International Application No. PCT/CA2017/050456, Publication No. WO/2017/177332, dated Oct. 25, 2018.

The International Preliminary Report on Patentability for Application No. PCT/CA2017/050456, Publication No. WO/2017/177332, dated Oct. 25, 2018.

Garfinkel, Carving Contiguous and Fragmented Files with Object Validation, DFRWS 2007 USA, Digital Investigation 4S (2007) S2-S12, Sep. 2007.

Garfinkel et al., New XML-Based Files: Implications for Forensics, IEEE Security & Privacy, vol. 7, Issue 2, Apr. 7, 2009 (Apr. 7, 2009).

Wagner et al., Database Forensic Analysis Through Internal Structure Carving, DFRWS 2015 USA, Digital Investigation 14 (2015) S106-S115, Aug. 2015.

European Patent Office, European Search Report from EP Patent Application No. 17781685.7 dated Sep. 5, 2019.

* cited by examiner

SYSTEMS AND METHODS FOR COLLECTING DIGITAL FORENSIC EVIDENCE

RELATED APPLICATIONS

This application claims the benefit of U.S. provisional patent application Ser. No. 62/321,869, filed Apr. 13, 2016, the entire contents of which are hereby incorporated by reference herein.

BRIEF DESCRIPTION OF THE DRAWINGS

A preferred embodiment of the present invention will now be described in detail with reference to the drawings, in which.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++, Java or any other suitable programming language and may comprise modules or classes, as is known to those skilled in computer programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Historically, forensic data investigation tools were limited to exploring data items as recovered from a target device filesystem. That is, only the files and folders present on the target device could be examined forensically. In some cases, raw data could also be examined. This created a significant burden on investigators to both understand where files of interest may be located on a filesystem, and also to examine a large quantity of files for evidence of interest.

More recently, forensic data investigation tools have included refining tools capable of identifying and extracting "artifacts" that may be of interest regardless of the underlying data location within a filesystem. In some cases, the artifacts may comprise data extracted from within particular files, or pulled from locations scattered across multiple files.

The artifacts may be stored in a forensic database, as records of the data fragments from which they are generated. Generally, these fragment records are composed of metadata about the underlying source data and an indication of where the source data can be retrieved. However, in some cases, the fragment records may contain some or all of the original source data.

For example, an artifact can be created for an instant messenger chat history. The history may subsist in multiple files in a filesystem but, by using preconfigured refining tools, a complete history artifact can be generated for presentation to the investigator in a single view. This greatly enhances efficiency, usability and comprehension.

Heretofore, refining tools within forensic data investigation tools have been pre-programmed in the forensic data investigation software itself, and therefore their use has been limited only to certain well-defined and widely-used types of artifacts. Examples include, but are not limited to:

- Uniform resource locators (URLs) in known formats, which can be parsed from a variety of sources, such as other documents, web browser histories, e-mails, chat messages;
- Web browser cookies, bookmarks, cache files, passwords and autofill data, history data, search queries, downloaded web pages, for known web browser versions;
- Instant messenger chat logs for known software;
- Call logs for certain models of phone;
- Cached network files (e.g., from popular cloud-based file storage services);
- Photos stores by popular photo catalog software;
- E-mail messages and attachments from known e-mail clients, which may be stored in monolithic database files or obfuscated files specific to a particular e-mail client software;
- Peer-to-peer (P2P) file sharing history of popular P2P software;
- Media files (including media files that were embedded in other file types);
- Documents, such as word processor, spreadsheet, presentation and other documents by known software;
- Operating system configuration files, such as user account information, peripheral information, system cache files, network interface data, installed software data, and still more, all of which may be stored in registry databases or other binary or text extensible markup language (XML) files.

However, even with a wide variety of known artifacts, new artifacts are constantly being developed and identified. For example, a refining module capable of identifying web browser histories generated by one web browser (Microsoft Internet Explorer™) generally is not capable of identifying web browser histories generated by a different web browser (e.g., Mozilla Firefox™). In other instances, a module that works with one version of a browser (e.g., Internet Explorer™ 6) may cease to identify histories generated by a new version of the same web browser (e.g., Internet Explorer™ 9). Or a new web browser may be introduced, which uses a different format.

In other cases, investigators may wish to specify a type of artifact particular to a current investigation. For example, an investigator tasked with a corporate espionage investigation may wish to identify files generated by a proprietary software application that is not widely used or known. In still other cases, investigators may be unable to share the specification for a desired artifact with the forensic investigation software developer, due to secrecy or security concerns.

The described embodiments generally enable a user of forensic data investigation tools to create and apply custom artifact definitions when analyzing forensic data, thereby allowing for extensibility of the forensic data investigation tools without the need for a new version of the forensic data investigation tool, or even the involvement of the forensic data investigation tool developer.

Figure 1:
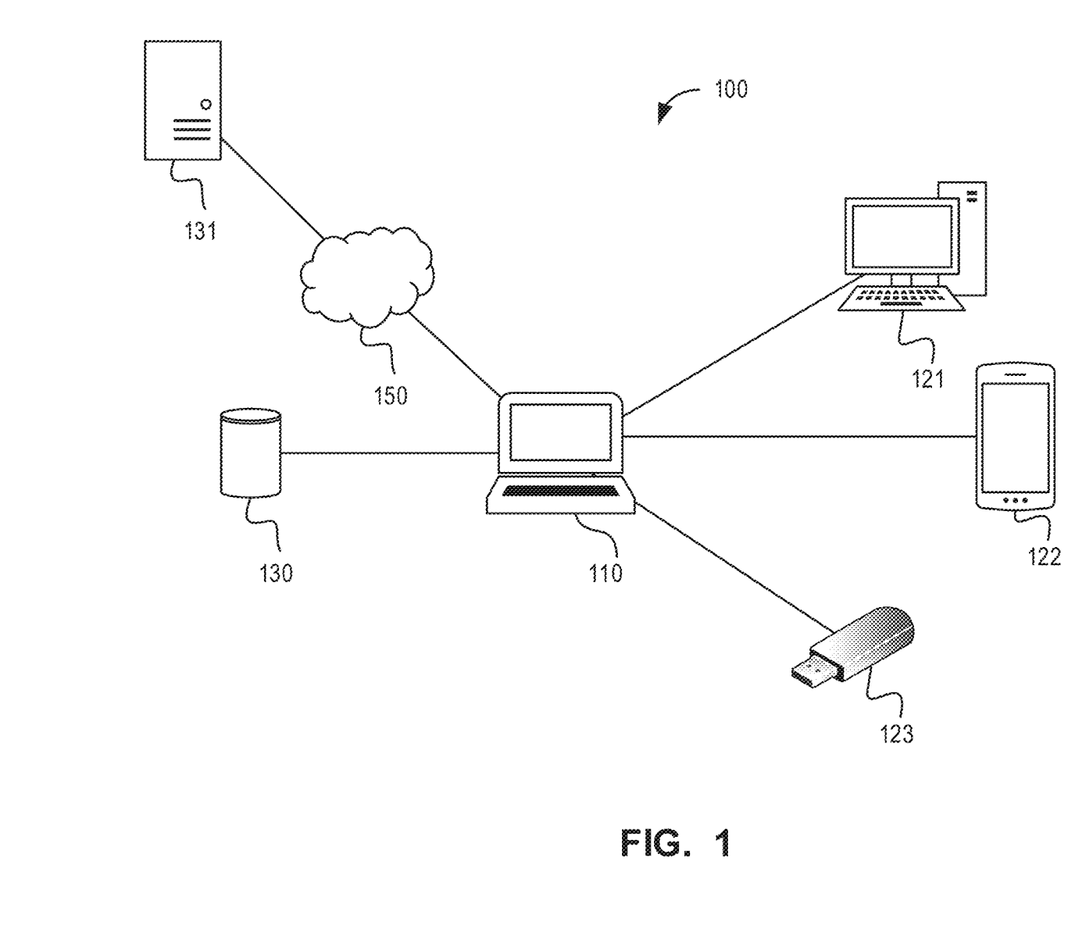
FIG. 1 is a block diagram of a digital forensic data investigation system in accordance with an example embodiment.

Referring now to FIG. 1, there is provided is a block diagram of a digital forensic data investigation system in accordance with an example embodiment.

Data investigation system 100 generally comprises a computing device 110, which is coupled to a data storage device 130, and which optionally may be coupled to one or more target devices, such as a desktop computer 121, mobile device 122 and data storage device 123. Coupling may be achieved using a physical connection, such as a Universal Serial Bus (USB) connector or cable, an IEEE 802.3 (Ethernet) network interface, or other suitable coupling interface or adapter. Target devices may also be any type of data storage media, such as magnetic and solid state disk drives, optical media, or network file shares.

Computing device 110 has one or more software application as described herein. As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

In particular, computing device 110 is provided with a forensic data investigation software application, to acquire data from one or more target device. For example, the forensic data investigation software application may do a low-level block-based copy from a target device storage media, to retrieve all data on the device, regardless of whether attempts have been made to delete the data. In other cases, the forensic data investigation software application may simply copy files and folders using operating system-level file copy facilities. Specific techniques for forensic data retrieval from a target device will be known.

The forensic data investigation software application may analyze the retrieved data to identify data items of interest, as described further herein. Generally, data items can represent any data that can be retrieved from target device storage media, such as files, databases, folders, block data or byte ranges, volume information, file images, and the like.

On their own, data items generally can be viewed using a text preview, which converts the raw data into a text representation (e.g., using ASCII or UTF encoding), or in a binary or hexadecimal representation. However, reviewing large amounts of data items in this format is time-consuming and difficult. Therefore, computing device 110 may generate a plurality of data artifacts.

Data artifacts are a type of data item that represents one or more other data items in a structured way.

A simple form of data artifact can be created or "refined" based on the filename extension of a data item retrieved from the target device. For example, the computing device may generate a data artifact of type "documents" for a data item with a file extension of .DOCX.

However, more advanced data artifacts can also be generated through the use of one or more refining modules. For example, the computing device may search for data patterns indicative of particular file types, such as media files, to generate media data artifacts or text data artifacts, respectively. Such generation of data artifacts can occur regardless of whether attempts have been made to obfuscate the nature of a particular file, for example, by changing a file extension or even deleting a file (where the underlying raw data can be recovered from unused space on the target device storage media).

Refining modules can be provided or defined for a wide variety of data artifacts. Some refining modules can be pre-programmed or pre-configured with the forensic data investigation software application. However, the described embodiments provide for one or more refining modules that are extensible, for example, by an end-user.

Some types of data items may be used to generate more than one data artifact. For example, an e-mail database may be used to generate a large number of data artifacts corresponding to individual e-mail messages.

Data items, including data artifacts, may be stored in a data collection once generated. The data collection can be an electronic database file stored in a data storage device 130. The electronic database file may be a relational database, such as Microsoft SQL Server™ or a non-relational database, such as a key-value database, NoSQL database, or the like. In some cases, a data collection may contain data items retrieved from more than one target device and, because data artifacts are a type of data item, the data collection may also contain data artifacts generated by the computing device. Each data item in the data collection may be tagged with information to identify the target device that is the source of the data item. In some cases, a data collection may contain only records of data artifacts or data items, along with indications of where the source data can be retrieved (e.g., on the target device).

Data storage device 130 is a non-volatile data store coupled to computing device 110. For example, data storage device 130 may be an external storage device coupled to computing device 110 locally, an internal device such as a hard drive. In some cases, computing device 110 may be coupled to a networked storage device 131 via a data communication network 150. Data communication network can be a private data communication network, such as a local area network or wide area network, or may also be a public data communication network, such as the Internet. When computing device 110 is configured to access data storage device 130 over a public network, or even over a private network, encryption (e.g., Transport Layer Security) can be used to safeguard data.

In some cases, computing device 110 can be provided with a forensic data investigation application. In operation, the forensic data investigation application can be used to retrieve the data collection, e.g., from data storage device 130, and to generate a user interface to facilitate forensic investigation of the data collection.

Figure 2:
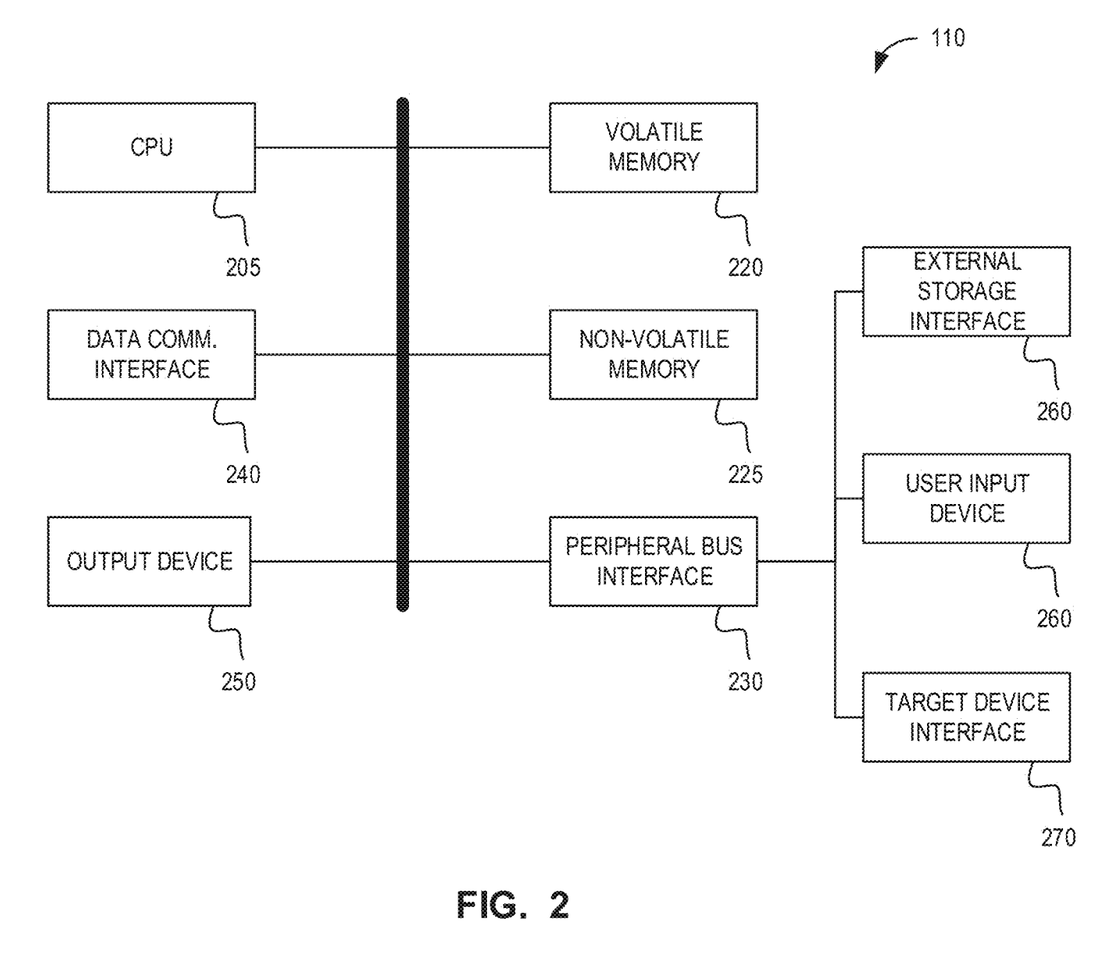
FIG. 2 is a simplified block diagram of a computing device in accordance with an example embodiment.

Referring now to FIG. 2, there is shown a simplified block diagram of a computing device in accordance with an example embodiment. Computing device 210 is one example of a computing device 110 as described in FIG. 1.

Computing device 210 has a processor 205, which is coupled to a volatile memory 220, a non-volatile memory 225, a peripheral bus interface 230, a data communications interface 240, an output device 250. The peripheral bus interface 230 may further couple processor 205 to an external storage interface 260, a user input device 260 and a target device interface 270. It will be appreciated that FIG. 2 is a simplified diagram of but one example embodiment, and that various other arrangements and computer system architectures may be used. For example, in some embodiments, data communications interface 240 may be coupled to processor 205 via peripheral bus interface 230.

Processor 205 is a computer processor, such as a general purpose microprocessor. In some other cases, processor 205 may be a field programmable gate array, application specific integrated circuit, microcontroller, or other suitable computer processor.

Processor 205 is coupled, via a computer data bus, to volatile memory 220 and non-volatile memory 225. Non-volatile memory 225 stores computer programs consisting of computer-executable instructions, which may be loaded into volatile memory 220 for execution by processor 205 as needed. It will be understood by those skilled in the art that references herein to a computing device as carrying out a function or acting in a particular way imply that a processor (e.g., processor 205 of computing device 210) is executing instructions (e.g., a software program) stored in a memory and possibly transmitting or receiving inputs and outputs via one or more interface. Volatile memory 220 may also store data input to, or output from, processor 205 in the course of executing the computer-executable instructions. In some cases, non-volatile memory 225 may store a data collection.

Processor 205 is also coupled to an output device 250, such as a computer display, which outputs information and data as needed by various computer programs. In particular, output device 250 may display a graphical user interface (GUI) generated by computing device 210.

Processor 205 is coupled to data communication interface 240, which is one or more data network interface, such as an IEEE 802.3 or IEEE 802.11 interface, for communication over a network.

Processor 205 may be coupled to a peripheral bus interface 230 via a data bus. In other embodiments, peripheral bus interface 230 may be omitted and processor 205 may be coupled to devices such as external storage interface 260 directly via a data bus.

In the example embodiment, peripheral bus interface 230 is coupled to an external storage interface 260, for example, to interface with external storage device 130.

Peripheral bus interface 230 is also coupled to one or more user input device 260, such as a keyboard or pointing device.

Finally, peripheral bus interface 230 can be coupled to a target device interface 270, for interfacing with and retrieving data from one or more target devices, such as target device 121 of FIG. 1.

In some embodiments, computing device 210 is a desktop or portable laptop computer 130. In other embodiments, computing device 210 may be a mobile device such as a smartphone or tablet computer.

Figure 3:
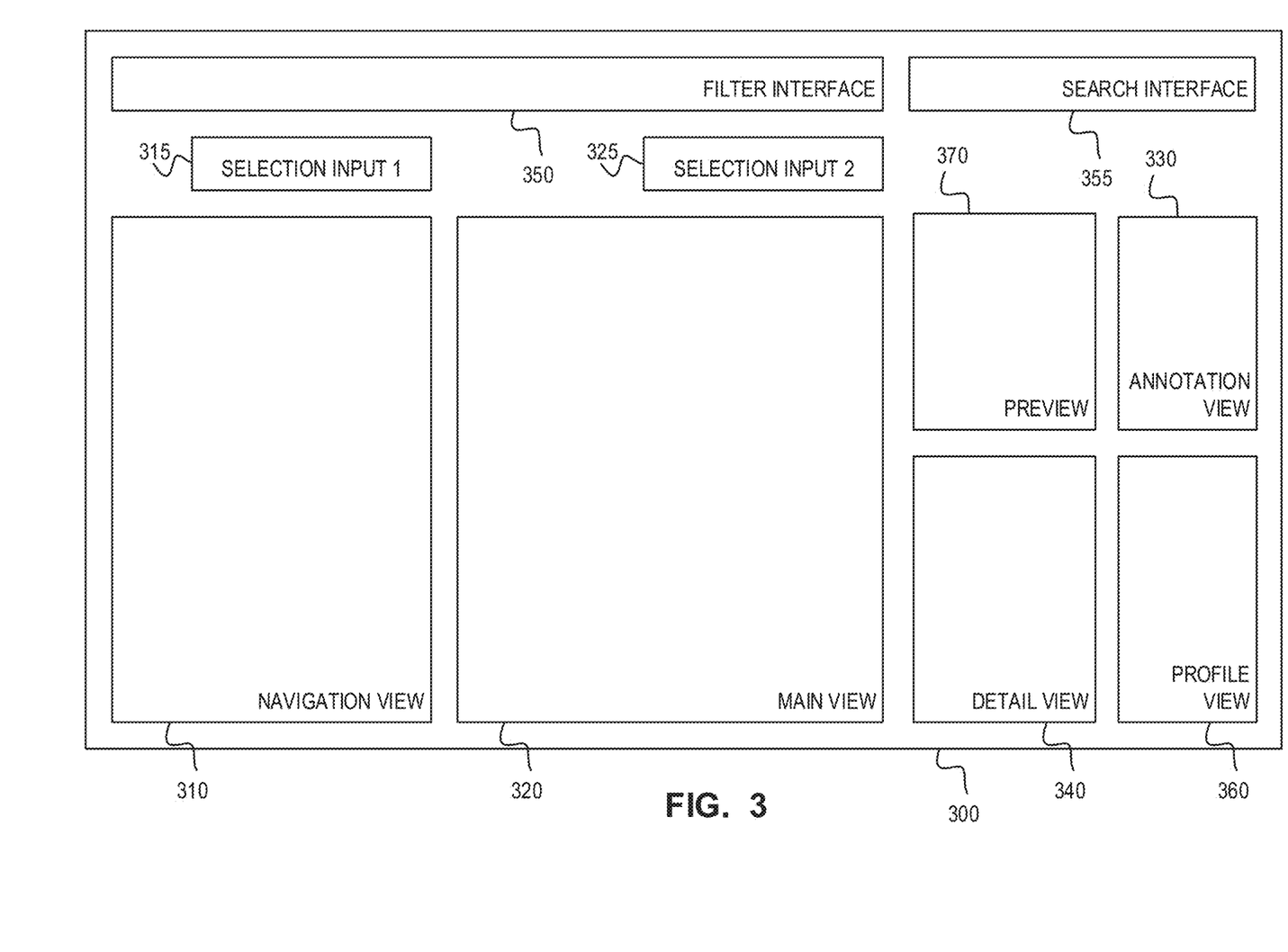
FIG. 3 is a graphical user interface of a forensic data investigation application in accordance with an example embodiment.

Referring now to FIG. 3, there is shown a graphical user interface of an example forensic data investigation application, which can be used to view a data collection once generated by the forensic data investigation tool.

Graphical user interface 300 may be generated by a computing device, such as computing device 110 or computing device 210, and displayed on a display such as output device 250 of computing device 210.

In particular, graphical user interface 300 may be generated and displayed to allow a user of the computing device to review and examine data items within a data collection, as generated by a forensic data investigation software application.

In the example embodiment, graphical user interface 300 has a navigation view area 310, a selection input 315, a main view area 320, a selection input 325, an annotation view area 330, a detail view area 340, a filter interface 350 and a search interface 355. Each of the areas or elements of graphical user interface 300 (e.g., navigation view 310, main view 320, annotation view 330, detail view 340 and preview 370) may be repositioned, resized, detached and displayed in a separate window or hidden from view, while remaining synchronized with the other elements. In some cases, additional elements may be displayed. In still other embodiments, various elements may be combined. For example, a preview may be displayed within a detail view 340.

Navigation view 310 may be used to display organizational data relating to data items. For example, while in an artifact view display type, navigation view 310 may be formatted to display one or more categories or subcategories of data artifacts, or both. A user of the computing device may select such categories or subcategories, to cause the computing device to search within a current data collection and generate a display of data artifacts within the selected categories or subcategories in a main view 320. Selection of a category or subcategory in navigation view 310 can be used as a type of implicit filter, in addition to explicit or contextual filters as described elsewhere herein.

Selection input 315 may be used to change the display type of navigation view 310. For example, selection input 315 may be a button or group of buttons or a drop-down dialog box, which allows the user to select one of a plurality of display types. One display type is the artifact view display type. However, examples of other display types are a filesystem display type, a database display type, a registry view display type, and generic display types.

In general, operation of the selection input 315 serves to change the display type of navigation view 310. In some cases, this change in display type may cause the presentation format of main view 320 to be changed accordingly. In such cases, computing device may attempt to retain the previously selected data items within main view 320 to the extent possible.

In a filesystem display type, navigation view 310 may be formatted to display a filesystem hierarchy corresponding to that of the target device or target devices used to generate the current data collection. For example, if a target device is a laptop computer, the displayed filesystem hierarchy may correspond to that of the target laptop computer's mass storage device (e.g., solid state disk). The navigation view 310 may allow the user to navigate within the filesystem hierarchy and select directories, the contents of which (i.e., data items originally found in the selected directory) can be displayed in main view 320. The navigation view 310 may allow for filesystem hierarchies to be expanded and collapsed, for example, by use of a disclosure triangle control.

In some cases, the filesystem display type may also display data items relating to filesystem components such as disk partitions, unallocated space, logical volumes, deleted files, and other objects associated with a filesystem.

In a registry view display type, navigation view 310 may be formatted to display a system registry hierarchy, such as the Microsoft Windows™ registry. For other operating systems, the registry view display type may be adapted to display system configuration files and information. For example, for the Mac OS X™ operating system, the registry view display type may display XML files and key-value data corresponding to system configuration settings. The navigation view 310 may allow the user to select certain registry parameters, and data items associated with the selected registry parameters can be displayed in main view 320. For example, the navigation view may display a registry tree, the registry tree having selectable registry tree elements that can be used to filter the displayed data items in main view 320 according to a selected registry tree element.

In a database display type, navigation view 310 may be formatted in similar fashion to filesystem display type, to display a filesystem hierarchy containing a database file or files, such as the file containing a SQL database. The navigation view 310 may allow the user to identify a database to examine, and data items associated with the selected database can be displayed in main view 320 in a database presentation format.

Main view 320 generally is used for the display of data items. Data items may be displayed in one or more presentation formats. Examples of presentation formats include, but are not limited to, column detail, row detail, chat thread, thumbnail, timeline, map, filesystem and registry. A selection input 325, such as a drop-down dialog, can be used to change between presentation formats.

In general, operation of the selection input 325 serves to change the presentation format of main view 320. Computing device may attempt to retain the previously selected data items within main view 320 to the extent possible for the presentation format.

Many of the described presentation formats allow for the display of data items in a heterogeneous list, that is, displaying more than one type of data item contemporaneously in main view 320. For example, a main view 320 in a row detail presentation format may display data artifacts of the media category, data artifacts of the chat category, data artifacts of the web browser category, data items of the file type, and still others in a single list. Other presentation formats can also display data items of multiple categories. For example, a column detail presentation format can similarly display data items of multiple categories in main view 320, in some cases displaying additional columns for attributes specific to each type of displayed data item.

When a particular data item is selected in main view 320, attributes of the data item also can be displayed in detail view 340 in a detailed summary format. Detail view 340 may be scrollable or resizable, or both, to allow a user to view all attributes relating to the selected data item. In some cases, detail view may also include a preview of the data item. In other cases, the preview may have a separate view.

Generally, detail view 340 can provide a summary of the attributes for a selected data item, where those attributes may also be displayed in columns of a column detail presentation format.

In some cases, multiple data item may be selected in main view 320, in which case detail view 340 may display aggregate information relating to, or common to, all selected data items.

A preview area 370 may also be provided in some cases. As the name implies, the preview area may display a preview of a selected data item. For example, for a media data artifact, preview area 370 may display a resized image or an image thumbnail of a video. In another example, for a document data artifact, preview area 370 may display a rendering of the document contents. In some cases, where the selected item is not a data artifact, preview area 470 may contain a text view which displays text strings extracted from the selected data item, or a hex view, which displays data in raw hexadecimal format for the selected data item. Various other types of previews for different types of data artifacts may also be displayed using a suitable renderer.

Annotation view 330 can be used to allow a user to tag data items with labels or annotations. Tags can be applied to any type of data item described herein, whether or not they are also data artifacts (e.g., files, folders, chat artifacts, etc.). Annotation view 330 may include predefined tags or labels, which can be selected in the graphical user interface 300. In some cases, annotation view 330 may allow the user to define additional tags or labels, comments and profiles, which can be applied to selected data items. Once defined, tags or labels, comments and profiles can be used as search or filter criteria.

Profile view 360 can be used to allow a user to assign a profile identifier to a data item. The profile identifier may be generated by the computing device when a new profile is created, and may optionally be given a friendly name by the computing device or the user. Generally, when the user assigns a profile identifier to a data item, computing device can parse the data item—which may be a data artifact—to determine whether the data item contains a unique user identifier, such as an e-mail address, chat service username, phone number, address or the like. The computing device may then analyze other data items within the data collection to identify instances of the unique user identifier, and assign the same profile identifier to those data items. The profile identifier can then be used to filter data items, for example using filter interface 350, allowing the user to quickly and easily identify data items that relate to a particular profile, which may itself relate to a particular person of interest. In some embodiments, profile identifiers may only be assigned to data artifacts.

Filter interface 350 can be used to filter the data items displayed in main view 320 or also navigation view 310. In general, filter interface 350 can be used to filter on any attribute of a data item, including but not limited to, type or category, dates and times, and tags. Filters can also be combined, for example by applying multiple filters successively. In some cases, Boolean operators, such as AND, OR or NOT may be applied to combine filters. In some embodiments, filter interface 350 may allow for pattern matching, e.g., with regular expressions, to be used to define filters.

When a filter is selected or applied, an active filter indication may be provided, to indicate that the filter is in effect and thereby limiting the data items displayed. In some cases, the active filter indication is a shading of the filter dialog, for example with a color. The active filter indication can be removed when all filters are deselected.

Similarly, search interface 355 can be used to enter freeform text and search for specific attributes, such as names, types, dates, and the like. An advanced search interface can also be provided, to allow a user to craft specific searches.

Figure 4:
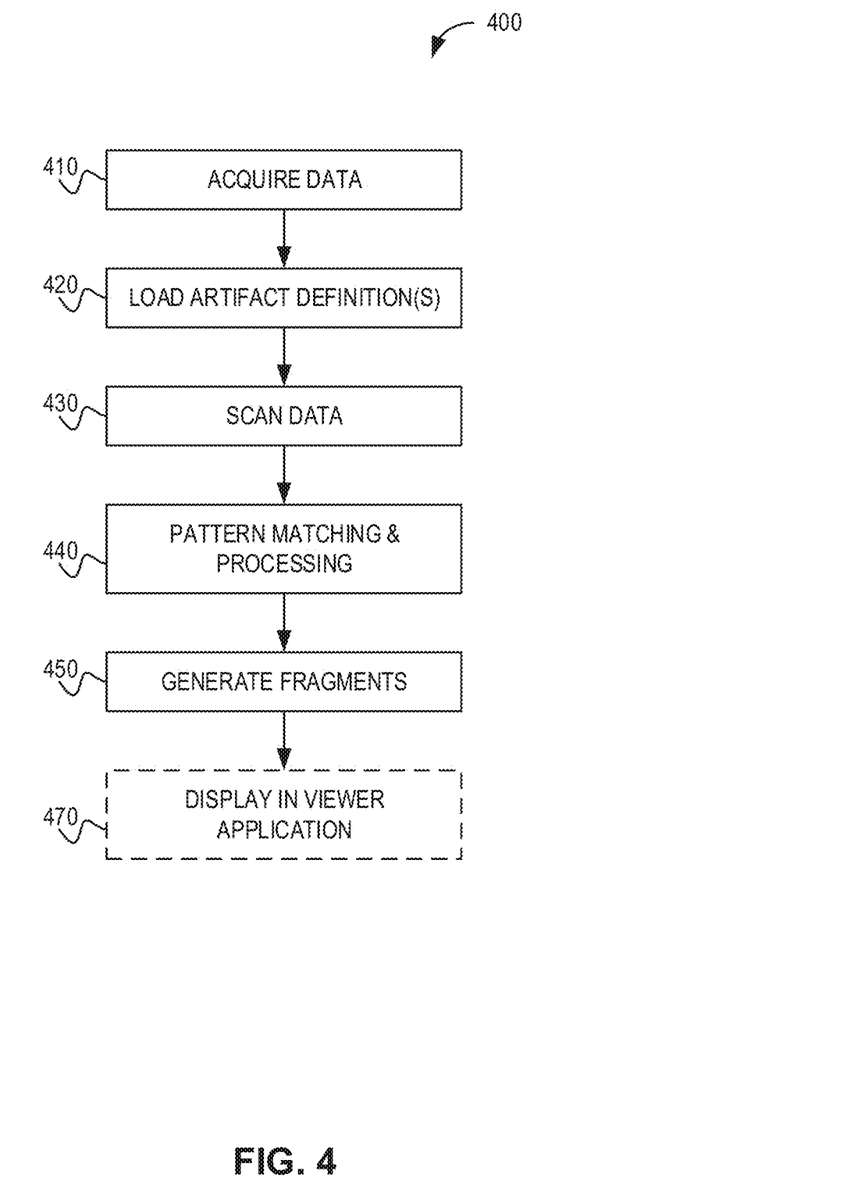
FIG. 4 is an example refining process flow in accordance with some example embodiments.

Referring now to FIG. 4, there is shown a retrieval or refining process flow in accordance with some example embodiments. Method 400 may be carried out, for example using computing device 110 executing a forensic data retrieval and investigation tool provided to the computing device and stored thereon.

Method 400 begins with acquisition of data from a target device at 410. Data may be acquired, for example, by a low-level block-based copy from a target device storage media, to retrieve all data on the device, regardless of whether attempts have been made to delete the data. In other cases, data may be acquired by copying files and folders using operating system-level file copy facilities. Other data retrieval techniques may also be used, as will be known.

At 420, the computing device 110 may load at least one artifact definition from a memory where the artifact definition is pre-stored. Each artifact definition may define one or more artifact type to be scanned for in the data acquired from the target device. Artifact definitions can be stored in the memory in the form of a structured data definition, such as an extensible markup language (XML) file, a Javascript Object Notation (JSON) file, or other suitable format or file.

In particular, artifact definitions can be provided in the form of user-editable files, which can be created and loaded without the need to alter or re-compile the forensic data investigation software.

Optionally, the forensic data investigation software may provide an interface for allowing the user to load or specify one or more artifact definition files. In some cases, artifact definitions may be provided or edited by way of a graphical user interface within the forensic data investigation software and stored in a structured data format, or using a proprietary data representation.

Each artifact definition may have a preamble or tag to define metadata regarding the artifact to be generated, such as a type, a name, a version and the like. An example artifact definition preamble may be specified as follows:
   <Artifact type="Fragment" name="URL" version="1.0">

Generally there may be at least two primary types of artifact definitions: database-type artifact definitions and fragment-type artifact definitions. Each artifact definition defines at least one pattern to be matched in the acquired data to identify candidate artifacts. Database-type artifact definitions may be created to search within existing databases and, as such, may contain primarily parsing patterns as described herein. In contrast, fragment-type artifact definitions may be created to search any type of data, whether structured or unstructured and, as such, generally contain carving patterns as described herein. Both types of artifact definition can contain a source definition.

A source definition can be specified in the artifact definition as a pattern to be matched in identifying a possible source of data. In some cases, the source definition can be a filename (e.g., outlook.pst) or partial filename (e.g., .docx). In some cases, the source definition can include, or be, a regular expression. One example source definition may be:
   <Source type="Filename">user.dat</Source>
Another source definition may be:

---

<Source type="Regex">[0-9]{4}-[A-Za-z0-9]{5}-[A-Za-z0-9]{4}.sqlite</Source>

---

Source definitions can be useful for narrowing the search for data of interest. For example, a source definition as above may be used to identify only those files that are likely to contain data of interest, such as registry databases, e-mail databases, and other files or databases, thereby lowering the processing burden and false positives that may result from a broader search. Accordingly, artifact definitions may contain at least one source definition, to aid in the refining process. In some embodiments, only one source definition is permitted. However, in some other embodiments, multiple source definitions may be permitted, which can be combined using logical operands (e.g., AND, OR). Some artifact definitions, such as a fragment-type artifact definition, may omit a source definition altogether.

Another type of pattern which may be used in an artifact definition is a parsing pattern. Parsing patterns are those that rely on existing filesystem or database structures, or operational application programming interfaces in order to extract data. For example, one type of parsing pattern is an SQL query. As such, parsing patterns are generally used in database-type artifact definitions, and usually in conjunction with at least one source definition.

When searching for data within a database, a database-type artifact definition can contain at least one parsing definition. One type of parsing definition may specify a database table name definition with a table name to be searched for the data, as follows:

<Table name="Users"/>

As an alternative to the table name definition, the parsing definition may include a database query definition, containing for example a SQL query, to be used within the database to retrieve the data subset of interest. For example, when searching for a particular subset of data in a database, one example parsing definition may be:

```
<Query>SELECT Album.[Cover] as Cover, Album.[Title] as
    Title, Artist.[Name] as Artist
    FROM Album
    INNER JOIN Artist
    ON Album.[ArtistId] = Artist.[ArtistId]
    WHERE Album.[Cover] IS NOT null</Query>
```

A database query can be constructed using a programmatic or query language. In some cases, the computing device may provide a graphical user interface to assist in generating a query.

As noted above, another type of pattern to be matched is a carving definition. Data carving is the process of extracting some data from a larger data set. As compared with parsing, data carving does not rely on existing file or database structures, or application programming interfaces. For example, data carving may be used during a digital investigation when corrupted files or unallocated file system space is analyzed to extract data. Generally, data can be "carved" from source data using specific header and footer values. As such, carving patterns are generally used in fragment-type artifact definitions.

When searching for a fragment-type artifact, an artifact definition contains a carving definition to identify a data subset in the acquired data. A carving definition generally contains one or more sub-definitions, used to specify more detailed characteristics of the data subset that is to be retrieved in order to generate a desired artifact.

When working with other types of data (e.g., other than data that can be parsed using a parsing definition), a carving definition can include a data pattern referred to as a "header" that can indicate the presence of a particular data subset of interest. In some embodiments, the header data pattern may be a requirement for a fragment-type artifact definition. The header data pattern may be an array or sequence of bytes, or multiple arrays of bytes, that are indicative of a desired file type. The header data pattern may also be in the form of a regular expression. Some header data patterns may be:

```
<Header value="0x11, 0x19, 0x1B, 0x2F, 0x2F" type="Hex"/>
<Header value="example" type="Text" offset="-16" />
<Header value="[0-9]{4}-[A-Za-z0-9]{5}" type="Regex"/>
```

In some cases, the header data pattern may specify data that is embedded within a file of interest, not necessarily at the start of a file. Therefore, the header data pattern may further include a byte offset that can be used to indicate a number of bytes to traverse forward or backward when generating a desired artifact. For example, the header data pattern may identify a pattern of bytes that always occurs 30 bytes after the start of a desired file type, therefore, the byte offset can indicate to the computing device that it should construct the artifact by retrieving data beginning at 30 bytes prior to the location of the header data pattern. Likewise, the byte offset can be used to retrieve only data that comes after the header data pattern occurs in the data.

In some cases, the carving definition may include a footer data pattern. Similar to the header data pattern, the footer data pattern can be a byte array or arrays, or a regular expression that indicates the end of an artifact of interest:

```
<Footer value="0x10,0x20,0x30,0x40" type="Hex"/>
<Footer value="end phrase" type="Text"/>
<Footer value="{zzz|ZZZ}" type="Regex"/>
```

In some cases, the carving definition may include a length definition, either in lieu of, or in addition to, the footer data pattern. In at least one embodiment, a length definition is required when a parsing definition is not present in the artifact definition. The length definition can include a minimum length of the artifact. Particularly in cases where a footer data pattern is not provided, the minimum length can be used to generate an artifact of a desired size. The length definition can also include a maximum length of the artifact, for example, to prevent generating artifacts over a predetermined size. An example length definition may be:

```
<Length
    minimum="8"
    maximum="1048576"
    offset="32"
    endianness="Little"
    type=uint32 />
```

The length definition may also include an indication of the data endianness and a data type. Data type may indicate, for example, a string or numerical format (e.g., int32, uint16, sbyte, etc.).

In some embodiments, the length definition can provide for dynamic length definition. To determine the length of an artifact with dynamic length, typically the offset, endianness and type attributes should be provided. Based on the offset, endianness and type attributes, the computing device can compute a dynamic length of the payload for each artifact that is generated.

In some embodiments, each artifact definition may contain more than one source, parsing or carving definition, which can be combined using logical operators. In some embodiments, the logical operators can be specified in the artifact definition. In some cases, the source, parsing or carving definitions may be cumulative, such that all definitions must be matched to generate one artifact. However, in some other cases, the source, parsing or carving definitions may be additive, such that each successive definition is used to identify discrete elements of a particular artifact. For example, for a web browser history artifact, one carving definition may be used to locate a URL in the web browser history, while another parsing or carving definition may be used to locate cached images; the resulting artifact can combine both data subsets into a single artifact.

Artifacts, once generated, are generally stored in a forensic database. Therefore, to provide a common structure for artifacts, the data subset retrieved according to the parsing or carving definition may be mapped to an artifact database using a mapping definition.

For example, for an artifact whose source is database data, the mapping definition can include a source database column name (i.e., column in which the source data was retrieved), a forensic database column name (i.e., that will contain the fragment record of the artifact). The mapping definition can also include a data type, such as integer, floating point number, text string, date/time, binary long object (BLOB) or the like. For example, the mapping definition may be as follows for a music catalog artifact generated using the example SQL query described above:

```
<Fragments>
    <Fragment
        source="Cover"
        alias="Album Cover"
        datatype="Attachment"
        category="None"/>
    <Fragment
        source="Title"
        alias="Album Title"
        datatype="String"
        category="None"/>
    <Fragment
        source="Artist"
        alias="Artist Name"
        datatype="String"
        category="None"/>
</Fragments>
```

In some embodiments, the mapping definition may also include one or more category, for categorization of the artifact by a forensic data viewer application as described with reference to FIG. 3.

For an artifact that originates from generic data, the mapping definition similarly may include a forensic database (i.e., output database) column name, a data type and a category. In some embodiments, more than one category may be specified. One example mapping definition for a URL-type artifact may be:

```
<Fragments>
    <Fragment source="Fragment" datatype="String"
        category="Url" />
</Fragments>
```

In some cases, an artifact definition may contain multiple mapping definitions, e.g., for mapping data from a database source to a single artifact.

Once the artifact definition is loaded and parsed at 420, the computing device may scan data acquired from the target device 430. The computing device may scan for multiple artifacts in one pass, or the computing device may scan for particular artifacts after the data has been acquired. In some alternative embodiments, the acquired data can be scanned on demand as artifact definitions are created or loaded.

At 440, data subsets that match patterns defined in artifact definitions can be extracted from the acquired data. In some cases, extraction may involve simply identifying the memory location or locations of the data subset in the acquired data, rather than copying of the data subset to a separate memory location.

At 450, artifacts are generated and stored in the forensic database as fragment records, using the associated mapping definitions. The resulting artifacts can be viewed using a suitable viewer application at 470.

Based on the described embodiments, a wide variety of artifact definitions can be created by the user. Some specific examples are provided herein to aid understanding.

In one example, a database-type artifact definition can be created to search within multiple databases with filenames that match a regular expression and containing a table named "Customer", to extract name and address information. Such a database-type artifact definition may be specified as follows:

```
<?xml version="1.0" encoding="UTF-8"?>
<Artifacts
    version="1.0">
    <Artifact
        type="SqliteArtifact"
        name="Chinook Customer Table"
        version="1.0">
        <Source type="Regex">[0-9]{4}-[A-Za-z0-9]{5}-[A-Za-z0-9]{4}.sqlite</Source>
        <Table name="Customer" />
        <Fragments>
            <Fragment
                source="FirstName"
                alias="First Name"
                datatype="String"
                category="None"/>
            <Fragment
                source="LastName"
                alias="Last Name"
                datatype="String"
                category="None"/>
            <Fragment
                source="Company"
                alias="Company Name"
                datatype="String"
                category="None"/>
            <Fragment
                source="Address"
                alias="Street Address"
                datatype="String"
                category="None"/>
            <Fragment
                source="City"
                alias="City"
                datatype="String"
                category="None"/>
            <Fragment
                source="Country"
                alias="Country"
                datatype="String"
                category="None"/>
            <Fragment
                source="Email"
                alias="Customer Email Address"
                datatype="String"
                category="PersonIdentifier"/>
        </Fragments>
    </Artifact>
</Artifacts>
```

In another example, a database-type artifact definition can be created to search within a database using a SQL query to extract media information. Notably, the query may contain information used to aid mapping, by using the SQL "as" keyword to define an SQL alias for each data value (e.g., Album.[Cover] as Cover). Such a database-type artifact definition may be specified as follows:

```
<?xml version="1.0" encoding="UTF-8"?>
<Artifacts
    version="1.0">
    <Artifact
        type="SqliteArtifact"
        name="Chinook Album Query with attachments"
        version="1.0">
        <Source type="FileName">Chinook_Sqlite.sqlite</Source>
        <Query>SELECT Album.[Cover] as Cover, Album.[Title]
            as Title, Artist.[Name] as Artist
                FROM Album
                INNER JOIN Artist
                ON Album.[ArtistId] = Artist.[ArtistId]
                WHERE Album.[Cover] IS NOT null</Query>
    <Fragments>
        <Fragment
            source="Cover"
            alias="Album Cover"
            datatype="Attachment"
```

```
        category="None"/>
      <Fragment
        source="Title"
        alias="Album Title"
        datatype="String"
        category="None"/>
      <Fragment
        source="Artist"
        alias="Artist Name"
        datatype="String"
        category="None"/>
    </Fragments>
  </Artifact>
</Artifacts>
```

In another example, a fragment-type artifact definition can be created to search within a SQLite database of business contacts to identify the names and job titles of known contacts. Although the source data is a database file, the file may be corrupted or altered, rendering it difficult or impossible to use database facilities to retrieve data. In such case, the SQLite database nevertheless may contain specific byte patterns that characterize the start (header) and end (footer) of a record. Therefore, a fragment-type artifact definition may be specified to carve data as follows:

```
<?xml version="1.0" encoding="UTF-8"?>
<Artifacts
    version="1.0">
  <Artifact
      type="FragmentedArtifact"
      name="Contacts Name + Job Title Finder"
      version="1.0">
    <Source
        type="FileName">Contacts_sqlite.sqlite</Source>
    <Headers>
      <Header value="0x11, 0x19, 0x1B, 0x2F, 0x2F"
          type="Hex"/>
    </Headers>
        <Footers>
            <Footer value="0x30, 0x30, 0x3A, 0x30, 0x30,
            0x3A, 0x30" type="Hex"/>
        </Footers>
    <Length maximum="64" minimum="8"/>
    <Fragments>
      <Fragment
        source="Fragment"
        datatype="String"
        category="None"/>
    </Fragments>
  </Artifact>
</Artifacts>
```

In another example, a fragment-type artifact definition can be created to search across all acquired data, to match any URL. Such a fragment-type artifact definition may be specified as follows:

```
<?xml version="1.0" encoding="UTF-8"?>
<Artifacts
    version="1.0">
  <Artifact
      type="FragmentedArtifact"
      name="HTML Link Finder"
      version="1.0">
    <Headers>
      <Header value="&lt;a href=" type="Text"/>
    </Headers>
        <Footers>
            <Footer value="&gt;" type="Text"/>
        </Footers>
    <Length maximum="1024" minimum="2"/>
    <Fragments>
      <Fragment
        source="Fragment"
        datatype="String"
        category="Url" />
    </Fragments>
  </Artifact>
</Artifacts>
```

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of retrieving digital forensic data from at least one target device using a computing device comprising a memory and a processor, the method comprising:
  receiving an artifact definition and a mapping definition, the artifact definition comprising a database-type artifact definition defining at least a first pattern to be matched and a fragment-type artifact definition defining at least a second pattern to be matched, wherein the first pattern comprises comprising at least one database parsing definition comprising a database query and the second pattern comprises at least one carving definition;
  adding the artifact definition to a plurality of artifact definitions in the memory;
  acquiring data from the at least one target device, the data stored on a data storage device of the at least one target device, the data comprising file metadata and file contents;
  loading the artifact definition from the memory;
  scanning the data first based upon the fragment-type artifact definition, and subsequently based upon the database-type artifact definition to identify a data subset that matches the first and second patterns;
  when the first and second patterns are identified, extracting the data subset from the data based on the at least one carving definition and the at least one database parsing definition, the data subset selected from the group consisting of a database artifact that matches the database-type artifact definition, a fragment artifact that matches the fragment-type artifact definition, and both the database artifact and the fragment artifact; and
  according to the mapping definition, generating a data fragment record in a forensic database based on the data subset, wherein the mapping definition maps elements of the data subset, as extracted based on the at least one carving definition and the at least one database parsing definition, to the data fragment record.

2. The method of claim 1, wherein the plurality of patterns comprises a source definition.

3. The method of claim 2, wherein the source definition comprises a filename.

4. The method of claim 2, wherein the source definition comprises a partial filename.

5. The method of claim 2, wherein the source definition comprises a regular expression.

6. The method of claim 1, wherein the at least one database parsing definition comprises a database table name.

7. The method of claim 1, wherein the at least one carving definition comprises a header data pattern.

8. The method of claim 7, wherein the header data pattern is a byte array.

9. The method of claim 7, wherein the header data pattern is a regular expression.

10. The method of claim 7, wherein the header data pattern further comprises a byte offset.

11. The method of claim 7, wherein the at least one carving definition comprises at least one of a footer data pattern and a length expression.

12. The method of claim 1, wherein the mapping definition comprises at least one of a source database column name, a forensic database column name, a data type and a category.

13. The method of claim 1, wherein the artifact definition is stored in a file.

14. The method of claim 13, wherein the file is editable by a user of the computing device.

15. A non-transitory computer-readable medium storing computer-executable instructions, the instructions when executed by a computer processor for causing the computer processor to carry out the method of claim 1.

16. A computing device comprising a memory and a processor, the processor configured to carry out the method of claim 1.

* * * * *